(12) United States Patent
Takei et al.

(10) Patent No.: US 7,999,955 B2
(45) Date of Patent: Aug. 16, 2011

(54) PRINTING SYSTEM, PRINT SERVER AND COMPUTER PROGRAM THAT DIFFERENTIATE BETWEEN ON-LINE AND OFF-LINE FINISHING DEVICES IN SAID PRINTING SYSTEM

(75) Inventors: Hajime Takei, Yokohama (JP); Katsuhito Yokoyama, Tokyo (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 1641 days.

(21) Appl. No.: 09/970,702

(22) Filed: Oct. 5, 2001

(65) Prior Publication Data
US 2002/0042798 A1 Apr. 11, 2002

(30) Foreign Application Priority Data
Oct. 6, 2000 (JP) ................................. 2000-307811

(51) Int. Cl.
*G06F 3/12* (2006.01)
*H04N 1/60* (2006.01)

(52) U.S. Cl. .......................... 358/1.15; 358/1.9; 358/1.1

(58) Field of Classification Search ................. 358/1.12, 358/1.14, 1.15, 1.13, 1.9; 709/203; 715/500, 715/522; 710/15, 16; 399/407
See application file for complete search history.

(56) References Cited

U.S. PATENT DOCUMENTS

| | | | | |
|---|---|---|---|---|
| 4,970,554 A * | 11/1990 | Rourke | ........................... | 399/84 |
| 6,509,974 B1 * | 1/2003 | Hansen | ........................ | 358/1.12 |
| 6,549,299 B1 * | 4/2003 | Allen et al. | .................... | 358/1.18 |
| 6,567,176 B1 * | 5/2003 | Jeyachandran et al. | ...... | 358/1.14 |
| 6,708,967 B1 * | 3/2004 | Trovinger et al. | .......... | 270/52.26 |
| 6,873,426 B1 * | 3/2005 | Farrell | .......................... | 358/1.15 |
| 7,061,636 B2 * | 6/2006 | Ryan et al. | .................... | 358/1.15 |
| 2002/0078012 A1 * | 6/2002 | Ryan et al. | ........................ | 707/1 |
| 2002/0080402 A1 * | 6/2002 | Robinson et al. | ............ | 358/1.15 |

FOREIGN PATENT DOCUMENTS

JP   A-10-198105   7/1998
JP   A-10-323910   12/1998

* cited by examiner

*Primary Examiner* — Twyler L Haskins
*Assistant Examiner* — Marcus T Riley
(74) *Attorney, Agent, or Firm* — Buchanan Ingersoll & Rooney PC

(57) ABSTRACT

A printing system capable of reducing workload of an operator by automatically separating finishing specifics of a printed product into tasks to be performed by an on-line printer and tasks to be performed by an off-line finishing device. The printing system comprises an on-line client, print server and printer as well as an off-line finishing device, and the print server receives the job ticket from the client, separates the finishing specifics included in the received job ticket into those to be performed by the printer and those to be performed by the finishing device based on information regarding specifications and installed options of the printer and finishing device, sets in the printer parameters for the finishing specifics separated and assigned to the printer, and creates data for a finishing device job ticket that includes the finishing specifics separated and assigned to the finishing device.

27 Claims, 7 Drawing Sheets

Fig.5

| JOB INFORMATION | JOB NUMBER | | X X X X X |
|---|---|---|---|
| DOCUMENT INFORMATION | ORIGINAL DOCUMENT NAME | | X X X X X |
| | TYPE OF FILE | | X X X X X |
| | TOTAL NUMBER OF PAGES | | 300 PAGES |
| USER INFORMATION | COMPANY NAME | | X X X X - Co. |
| | DEPARTMENT NAME | | XXXX - DEPARTMENT |
| | CONTACT PERSON'S NAME | | X X X X X |
| | TELEPHONE NUMBER | | 03-XXXX-XXXX |
| | E-MAIL ADDRESS | | XXXX@XX.co.jp |
| | PHYSICAL ADDRESS | | XX-X-X, XX WARD TOKYO METROPOLITAN |
| FINISHING INFORMATION | NUMBER OF COPIES | | 1000 SETS |
| | IMPOSITION | NONE | |
| | | DOUBLE SPEED | O |
| | | READER SPREAD | |
| | | PRINTER SPREAD | |
| | STAPLING | NONE | |
| | | RIGHT | |
| | | LEFT | |
| | | UPPER | |
| | | TWO PLACES IN MIDDLE | O |
| | BINDING | NONE | |
| | | CORNER STITCH | |
| | | SIDE STITCH | |
| | | TAPE | |
| | | FOLDED BINDING | O |
| | COVER PAGE | NONE | |
| | | PLAIN RED PAPER | |
| | | THICK RED PAPER | O |
| | FOLDING | NONE | |
| | | HALF | |
| | | Z-SHAPED FOLDING | |
| | TWO-SIDED PRINTING | No | |
| | | Yes | O |
| DELIVERY INFORMATION | DELIVERY DATE | | XX / XX / 2000 |
| | DELIVERY DESTINATION | | SAME AS USER'S ADDRESS |
| | DELIVERY METHOD | | XX TRANSPORT Co. |

Fig.7

INFORMATION OF SPECIFICATION AND INSTALLED OPTION

| FINISHING | | PRINTER | | FINISHING DEVICE | |
|---|---|---|---|---|---|
| | | SPECIFI-CATION | OPTION | SPECIFI-CATION | OPTION |
| IMPOSITION | DOUBLE SPEED | ○ | | | |
| | READER SPREAD | ○ | | | |
| | PRINTER SPREAD | ○ | | | |
| STAPLING | RIGHT | | ○ | | |
| | LEFT | | ○ | | |
| | UPPER | | | ○ | |
| | TWO PLACES IN MIDDLE | | | ○ | |
| BINDING | CORNER STITCH | | ○ | | |
| | SIDE STITCH | | ○ | | |
| | TAPE | | | | ○ |
| | FOLDED BINDING | | | | ○ |
| COVER PAGE | PLAIN RED PAPER | | | ○ | |
| | THICK RED PAPER | | ○ | ○ | |
| FOLDING | HALF | | ○ | | |
| | Z-SHAPED FOLDING | | | ○ | |
| TWO-SIDED PRINTING | YES | ○ | | | |

○ · · · FUNCTION SUPPORTED BY PRINTER OR FINISHING DEVICE

SCREENING · · · PROCESSES SORTED FROM FINISHING SPECIFICS INCLUDED IN JOB TICKET

Fig.8

FINISHING DEVICE JOB TICKET ( BEFORE JOB COMPLETION )

JOB NUMBER | || |||||

☐ STAPLING – TWO PLACES IN MIDDLE
☐ BINDING – FOLDED BINDING
☐ COVER PAGE – THICK RED PAPER

| | |
|---|---|
| DELIVERY DATE | X X / X X / 2000 |
| DELIVERY DESTINATION | XX-X-X, XX WARD, TOKYO METROPOLITAN |
| DELIVERY METHOD | XX TRANSPORT Co. |
| USER NAME | XXXX, XX Co., XX DEPARTMENT |

FINISHING DEVICE JOB TICKET ( AFTER JOB COMPLETION )

JOB NUMBER | || |||||

■ STAPLING – TWO PLACES IN MIDDLE
■ BINDING – FOLDED BINDING
■ COVER PAGE – THICK RED PAPER

| | |
|---|---|
| DELIVERY DATE | X X / X X / 2000 |
| DELIVERY DESTINATION | XX-X-X, XX WARD, TOKYO METROPOLITAN |
| DELIVERY METHOD | XX TRANSPORT Co. |
| USER NAME | XXXX, XX Co., XX DEPARTMENT |

PRINTING SYSTEM, PRINT SERVER AND COMPUTER PROGRAM THAT DIFFERENTIATE BETWEEN ON-LINE AND OFF-LINE FINISHING DEVICES IN SAID PRINTING SYSTEM

This application is based on Japanese Patent Application No. 2000-307811 filed in Japan on Oct. 6, 2000, the entire content of which is hereby incorporated by reference.

BACKGROUND OF THE INVENTION

1. Field of the Invention

The present invention relates to a printing system that receives a document print order from the user via a job ticket, and more particularly, to a novel printing system that, where finishing is performed using an on-line printer and an off-line finishing device, sorting and other operations regarding the finishing specifics is automated so that the workload of the operator is reduced.

2. Description of Related Art

Job tickets (work instructions) are used as one method of communicating the finish, delivery, etc. of a printed product when the user orders printing of a document from a print shop and the like. In this type of printing system, the user uses a client computer to create a job ticket that includes the requested finish, the delivery method, etc., and transmits the job ticket to the print server of a print shop together with the print data for the original document in order to order printing of the document. In doing so, the user can receive the printed product, which is finished in the requested fashion, on the requested date and at the requested place.

Such a printing system may include an on-line printer, which is connected to the print server via a network, and an off-line finishing device, which is not connected to the print server, and the finishing process regarding the printed product may be performed using both the on-line printer and the off-line finishing device. Because the job ticket sent from the user includes finishing specifics that are to be carried out using the on-line printer and those that are to be carried out using the off-line finishing device, and because there are no distinctions between the two types of instructions, the operator must take into consideration the specifications of the printer and the finishing device as well as the optional functions, etc. installed thereon, separate the finishing specifics included in the job ticket into those to be performed using the on-line printer and those to be performed using the off-line finishing device, and accordingly set the printer and finishing device to perform the finishing. In addition, currently, the operator manually issues a job completion notification to the user when printing is completed. However, these tasks of separating the finishing specifics, etc. are quite complicated, and the development of a printing system that is capable of automatically performing such tasks and reducing the workload of the operator has been desired.

OBJECTS AND SUMMARY

An object of the present invention is to provide an improved printing system that resolves the various problems described above, as well as a print server and a computer program that are used in the printing system.

Another object of the present invention is to provide a printing system that can automatically perform such tasks as sort finish specifics and set parameters, thereby reducing the workload of the operator, as well as a print server and a computer program used in the printing system.

Yet another object of the present invention is to provide a printing system that can supply printed products in a speedy and reliable fashion by increasing accuracy in the sharing of tasks between the on-line printer and the off-line finishing device, as well as a print server and a computer program that are used in the printing system.

These and other objects are attained by providing a printing system that includes an on-line client, print server and printer, as well as an off-line finishing device, for example, wherein the print server comprises the following components:

first memory means for storing the specifications of the printer and of the finishing device as well as the information regarding the options installed thereon;

receiving means for receiving from the client the data pertaining to a job ticket that includes at least the finishing specifics for the printing to be executed;

sorting means for, based on the information regarding the specifications and installed options that is stored in the first memory means, separating the finishing specifics included in the job ticket received by the receiving means into those to be performed by the printer and those to be performed by the finishing device;

setting means for setting in the printer the parameters for the finishing specifics separated by the sorting means and assigned to the printer; and creating means for creating data for a finishing device job ticket that includes the finishing specifics separated by the sorting means and assigned to the finishing device.

In the printing system described above, it is preferred that the print server further includes a transmitting means by which to transmit to the printer the data pertaining to the finishing device job ticket that was created by the creating means so that the finishing device job ticket may be printed out.

It is also preferred that the printing system further includes an on-line scanner, and that the print server further includes the following components:

second memory means for storing the job information and user information included in the job ticket received by the receiving means;

reading means for reading the job information from the data obtained by reading via the scanner the finishing device job ticket that was printed by the printer; and notifying means for calling the user information stored in the second memory means based on the job information read by the reading means and notifying the client of job completion based on the user information.

BRIEF DESCRIPTION OF THE DRAWINGS

These and other objects and features of the present invention will become clear from the following description taken in conjunction with the preferred embodiments thereof with reference to the accompanying drawings, in which:

FIG. 5 shows one example of a job ticket created using the client 10;

FIG. 7 is a table showing one example of the specification and installed option information regarding the printer 30 and finishing device 60 that is maintained in the print server 20;

FIG. 8 is one example of a finishing device job ticket that is created by the print server 20.

DETAILED DESCRIPTION OF THE PREFERRED EMBODIMENTS

An embodiment of the printing system of the present invention is explained in detail below with reference to the drawings.

Figure 1:
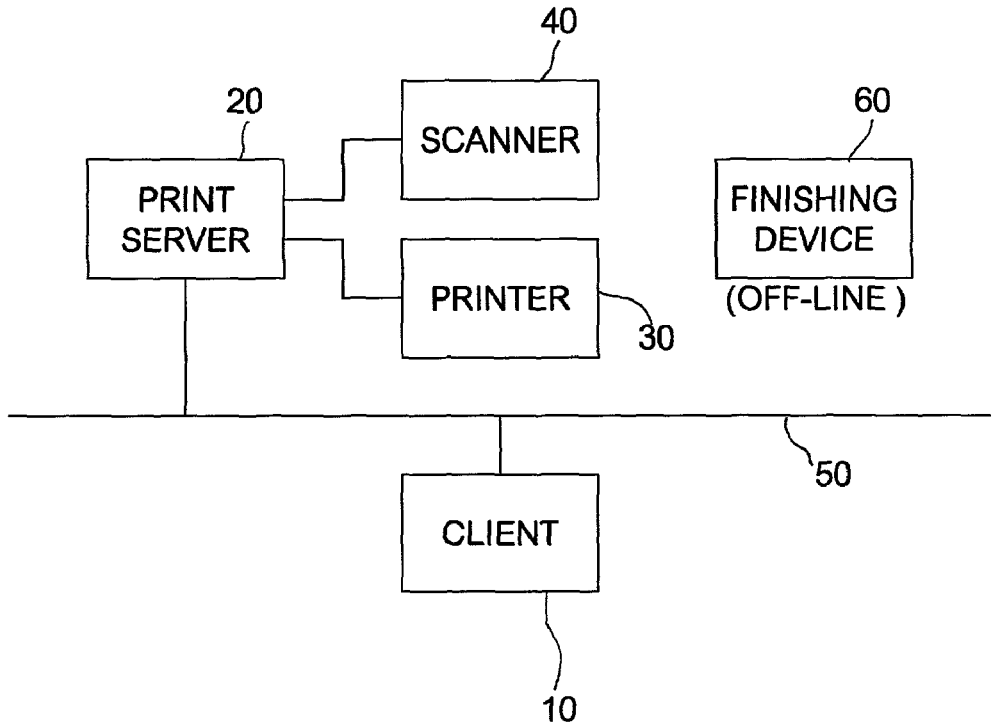
FIG. 1 is a block diagram showing one embodiment of the construction of the printing system of the present invention.

FIG. 1 is a block diagram showing one embodiment of the construction of the printing system of the present invention. In FIG. 1, the client 10 and print server 20 are mutually connected via a network 50. The printer 30 and scanner 40 are locally connected to the print server 20 via dedicated lines. The finishing device 60 is not connected to any other devices either via a dedicated line or the network.

As described above, the printing system of the present embodiment comprises an on-line client, print server, printer and scanner, as well as an off-line finishing device. Here, 'on-line' means that the device is connected to the other devices of the printing system locally or via a network, and 'off-line' means that the device is not connected to any of the other devices of the printing system via either route. Therefore, in this embodiment, the printer 30 and scanner 40 need not be a local printer or scanner connected to the print server 20, but may be a network printer or scanner directly connected to the network 50.

In the printing system of the present invention, the printer 30 and scanner 40 need not be independent devices. Instead, a device including an image forming means and an image input means, such as a copying machine, may be used.

Figure 2:
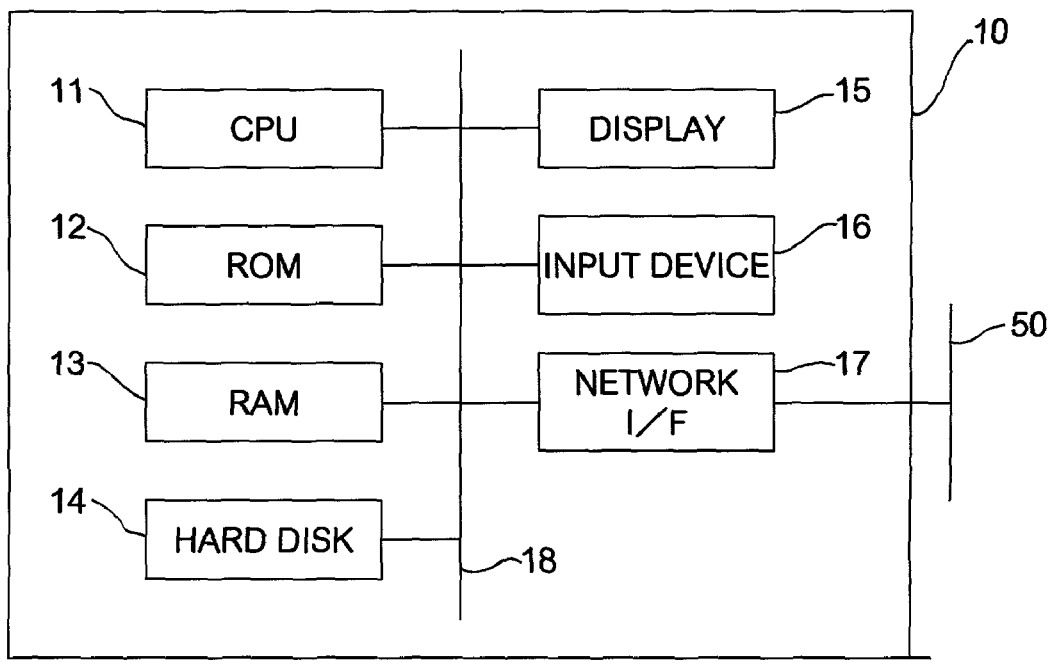
FIG. 2 is a block diagram showing the basic construction of the client 10.

FIG. 2 is a block diagram showing the basic construction of the client 10. The client 10 is a computer, and has a CPU 11, a ROM 12, a RAM 13, a hard disk 14, a display 15, an input device 16, a network interface (I/F) 17, etc., which are mutually connected via the bus 18. The CPU 11 reads programs and outputs results, the ROM 12 stores control programs and data, including a BIOS, the RAM 13 temporarily stores programs and data, the hard disk 14 stores various programs and data, including the operating system, the display 15 displays various information using images, the input device 16 comprises a pointing device, such as a mouse, as well as a keyboard, and the network interface 17 is an interface by which to mutually communicate with the client 10 and other devices via the network 50.

Figure 3:
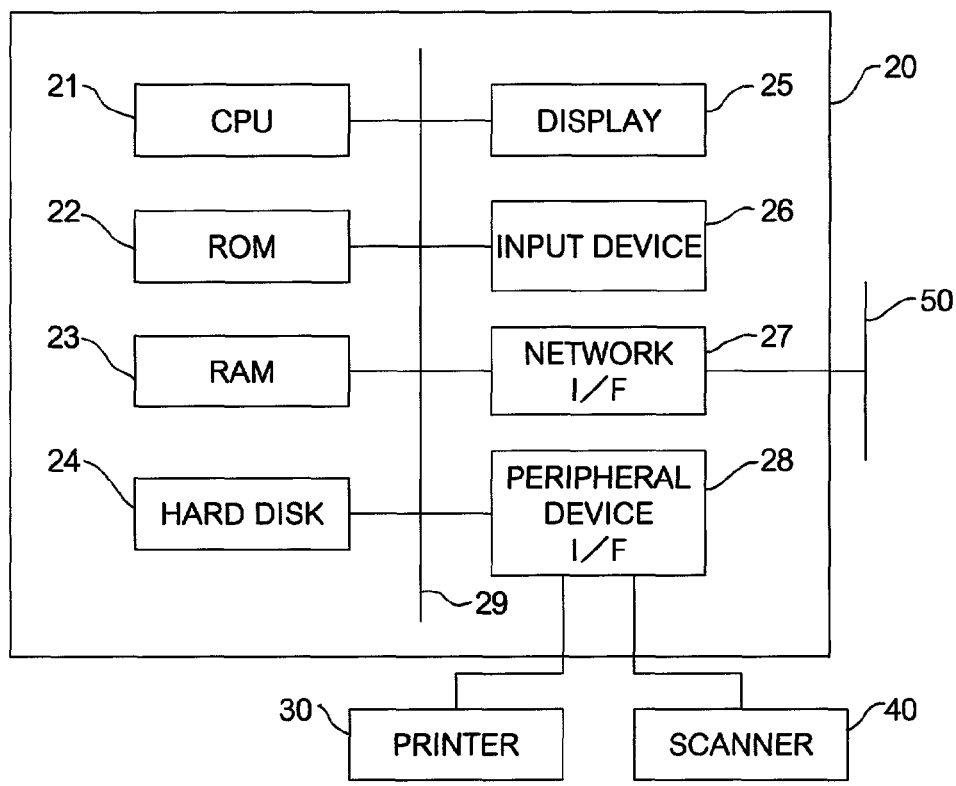
FIG. 3 is a block diagram showing the basic construction of the print server 20.

FIG. 3 is a block diagram showing the basic construction of the print server 20. The print server 20 is also a computer, and has a CPU 21, a ROM 22, a RAM 23, a hard disk 24, a display 25, an input device 26, a network interface (I/F) 27, a peripheral device interface (I/F) 28, etc., which are mutually connected via the bus 29. The CPU 21, ROM 22, RAM 23, hard disk 24, display 25, input device 26 and network interface 27 have the same functions as the equivalent components included in the client 10. The peripheral device interface 28 is an interface by which to mutually communicated with the printer 30, scanner 40 and other devices via dedicated lines.

The printer 30 forms images based on the bitmap data or compressed bitmap data transmitted from the print server 20. In the printing system, the printer 30 can have finishing features such as two-sided printing, stapling, punching and folding.

The scanner 40 irradiates the original document with light using a light source comprising a fluorescent lamp or the like, reads the light reflected therefrom using a light receiving element such as a CCD or CIS, and incorporates it as bitmap data. In the present invention, a flatbed scanner, sheet feed scanner or bar code reader may be used as the scanner.

The finishing device 60 is a device that performs various bookbinding tasks. It is capable of performing stapling, punching, folded binding, taping finish, etc. on a printed product having a thickness or thick paper with which such finishing is not possible using a regular printer.

Figure 4:
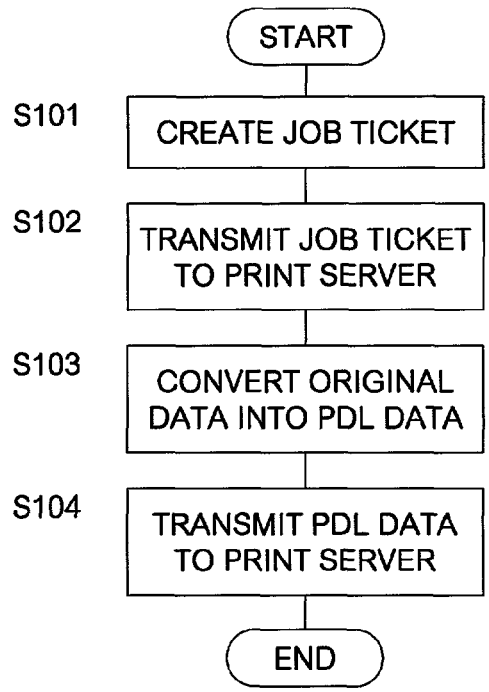
FIG. 4 is a flow chart showing the sequence of printing order creation in the client 10.

FIG. 4 is a flow chart showing the sequence of printing order creation in the client 10. In the printing system of the present embodiment, a printing order is placed by transmitting a job ticket (or more precisely, data pertaining thereto) and print data to the print server. In other words, a job ticket is first created in the client 10 (S101). Creation of a job ticket is performed by the user inputting prescribed information on the display 15 using the input device 16, such as a mouse and keyboard. FIG. 5 shows one example of a job ticket created on the client 10. As shown therein, the job ticket includes in the form of a table job information such as the job number, document information such as the original document name, file (application) type and total number of pages, user information such as the company name, department name, contact person's name, telephone number, e-mail address and physical address, finishing information such as the number of copies, imposition, whether the final product should be stapled, bound or folded, whether a cover page is required, and whether printing should be two-sided printing, and delivery information such as the delivery date, delivery destination and delivery method. The created job ticket is transmitted to the print server 20 via the network 50 (S102).

At the same time, the original data is converted into a page description language (PDL) that is intelligible to the print server 20 (S103). For the original data, files created using various application software programs or document files created using associated business systems are used. In addition, the conversion into the PDL is normally carried out by the printer driver, which comprises a software program, and for the PDL, PostScript® from Adobe Systems is used, for example. The post-conversion PDL data is transmitted to the print server 20 via the network in the same way as the job ticket (S104).

The process of job ticket creation (S101 and S102) and the process of conversion of the original data into PDL (S103 and S104) can take place either sequentially or simultaneously.

Figure 6:
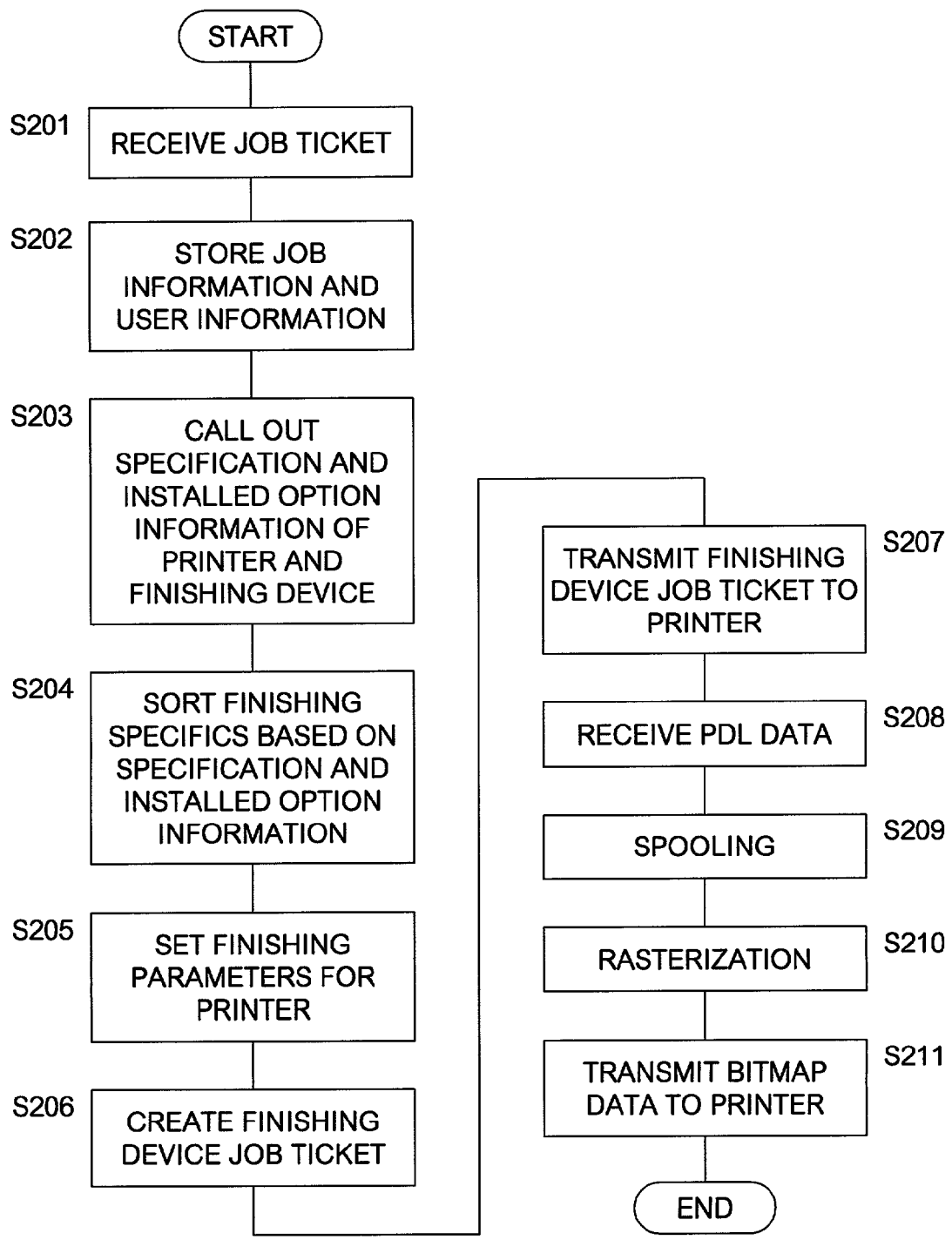
FIG. 6 is a flow chart showing the sequence followed in the print server 20, from the receipt of a printing order through printing.

FIG. 6 is a flow chart showing the sequence followed in the print server 20, from the receipt of a printing order through printing. When the job ticket transmitted from the client 10 is received by the print server 20 (S201), among the various information included in the job ticket, at least the job information and user information are stored in the storage device such as the RAM 23 or hard disk 24 (S202).

The finishing specifics (finishing information) for the job indicated on the job ticket are then separated into tasks that are to be handled by the printer 30 and tasks that are to be performed by the finishing device 60 (S203-S207). In other words, in the printing system including an on-line printer and an off-line finishing device, as in the illustrated embodiment, the finishing of the final printed product may be performed using both the on-line printer and the off-line finishing device. In this case, the processes for the on-line printer, the processes for the off-line finishing device and the processes that may be performed by either device are shown in the job ticket in a mixed fashion. Conventionally, the operator performed necessary setting after determining which processes should be handled by the printer and which processes should be carried out by the finishing device while taking into consideration the specifications and the options installed on the on-line printer and the off-line finishing device, based on the description of the finish in the job ticket sent from the client, but because such a task is quite complicated, this imposed an undue burden on the operator. In the present invention, because the print server automatically sorts the finishing specifics based on the description of finish included in the job ticket (the finishing information), not only is the workload of the operator substantially reduced, but erroneous determinations by the operator may also be eliminated, thereby increasing the accuracy of the separation of tasks between the printer and the finishing device and enabling speedy and reliable performance of the finishing processes.

The sorting of finishing specifics carried out by the print server 20 is performed with reference to the information regarding the specifications and options installed on the printer 30 and finishing device 60, which is held in the print server 20. In other words, the specification and installed option information regarding the printer 30 and finishing device 60 is automatically detected or manually input by the operator each time a change is made thereto, and is maintained in the hard disk 24 of the print server 20. The specification and installed option information is first called out to the RAM 23 (S203). Based on the specification and installed option information, the finishing specifics included in the job ticket received from the client 10 are separated into tasks to be performed by the printer 30 and tasks to be handled by the finishing device 60 (S204). FIG. 7 shows a table-form example of the specification and installed option information pertaining to the printer 30 and the finishing device 60, which is maintained in the print server 20. According to the specification and installed option information of this example, among the finishing specifics included in the job ticket, the processes of 'imposition—double speed' and 'two-sided printing' are assigned to the printer 30, while the processes of 'stapling—two places in the middle' and 'binding—folded binding' are assigned to the finishing device 60. A finishing process that may be performed either by the printer 30 or the finishing device 60, such as 'cover page-thick red paper', is assigned in advance by the user or the operator based on a designated standard so that it will be performed by the printer or by whatever device that can carry out the processing most quickly.

The finishing parameters for the printer are then transmitted to the printer 30 based on the finishing specifics assigned to the printer as described above, and are set in the printer (S205). Consequently, the finishing parameters for the on-line printer, which in the conventional art were manually set by the operator, may be completely automatically set without operator intervention.

In addition, the finishing device job ticket is created as bitmap data based on the finishing specifics assigned to the finishing device as described above (S206). FIG. 8 shows one example of a finishing device job ticket that is created by the print server 20. As shown therein, the finishing device job ticket includes the finishing processes to be performed by the finishing device shown using a checklist format, as well as the job information, a bar code encoding the job information, the delivery information, etc. The finishing device job ticket created by the print server 20 is then transmitted to the printer 30 (S209).

Regarding the process of separating the finishing specifics, either the process of setting the printer finishing parameters (S205) or the process of creating the finishing device job ticket (S206 and S207) may be performed first, or both of the processes may be performed simultaneously.

At the same time, when the PDL data transmitted from the client 10 is received by the print server 20 (S208), it is spooled, stacked and managed in the print queue (S209). This spooling is normally carried out by a print spooler, which is a software program, and the PDL data is temporarily stored in part of the RAM 23 or hard disk 24. The PDL data stacked in the print queue is rasterized for each job, and is converted into bitmap data that may be output by the printer (S210). Where the PDL is PostScript®, for example, the rasterization is handled by a software-based or hardware-based RIP. The post-conversion bitmap data is then transmitted to the printer (S211).

The process of storing the user information, etc. (S202), the process of separating the finishing specifics (S203-S207) and the process of print data spooling and rasterization (S208-S211) may take place in any order or simultaneously.

The printer 30 prints out the bitmap data and the finishing device job ticket that are received from the print server 20. The printer 30 also performs finishing of the printed product in accordance with the printer finishing parameter settings set by the print server 20.

The off-line finishing device 60 then performs finishing of the printed product obtained using the printer 30 via operation by the operator in accordance with the instructions in the finishing device job ticket printed by the printer 30. The printed product finally finished by the finishing device 60 is delivered to the place designated by the user via the arrangements made by the operator in accordance with the instructions in the finishing device job ticket. Because the only tasks required are simply to operate the finishing device and make arrangements for delivery in accordance with the instructions in the finishing device job ticket in this way, the workload of the operator is significantly reduced.

When the job is completed, the finishing device job ticket, which includes check marks indicating job completion and made by the operator (FIG. 8), is read by the scanner 40. The image data for the post-completion finishing device job ticket read by the scanner 40 is transmitted to the print server 20.

Figure 9:
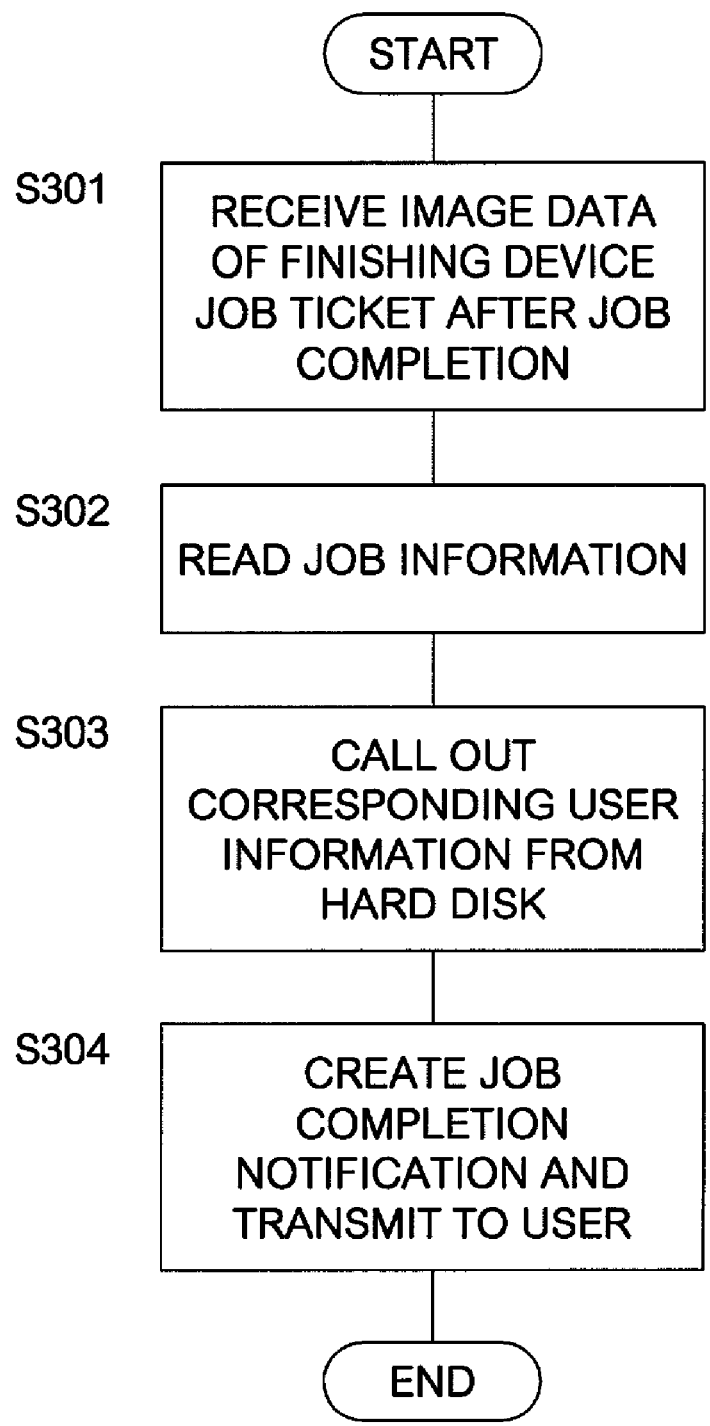
FIG. 9 is a flow chart showing the sequence followed in the print server 20 regarding job completion notification to the user.

FIG. 9 is a flow chart showing the sequence followed in the print server 20 regarding the issuance of a job completion notification to the user. When the image data for a post-completion finishing device job ticket is received by the print server 20 (S301), the job information is read from the bar code data included in the image data (S302). The corresponding user information is then called out from the hard disk 24 based on the job information (S303), and a job completion notification is created and transmitted to the user via such a means as e-mail based on the user information (S304). Consequently, because the user is notified of job completion automatically without the need for action by the operator, the workload involved in the operation is reduced. The job completion notification may include the results of the finishing instructed by the client and information regarding delivery, etc.

The printing method used in the print server or printing system pertaining to the present invention described above is implemented via a print server control program, which is recorded in a computer-readable recording medium.

Using the embodiment of the present invention explained above, the following effects may be obtained:

Because the finishing specifics included in the job ticket are automatically separated into tasks to be performed by the on-line printer and tasks to be performed by the off-line finishing device, the task of the operator to sort the finishing specifics may be eliminated.

Because the finishing specifics included in the job ticket are separated into tasks to be performed by the on-line printer and tasks to be performed by the off-line finishing device based on the specification and installed option information stored in advance, the accuracy in the sharing of tasks between the on-line printer and the off-line finishing device may be increased without any determination errors on the part of the operator, thereby enabling the performance of speedy and reliable finishing.

Because the parameters for the finishing to be performed by the on-line printer after sorting are automatically set in the printer, the task of the operator to set the finishing parameters in the printer may be eliminated.

Because a finishing device job ticket that only includes the finishing specifics to be handled by the off-line finishing device after sorting is created and printed out, the operator need only operate the finishing device in accordance with the instructions in the finishing device job ticket, significantly reducing the workload of the operator.

Because the stored user information is called out based on the job information read from the post-completion finishing device job ticket and the user is automatically notified of job completion, the task of the operator to notify the user of job completion may be eliminated.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A printing system comprising an on-line client, a print server, a printer capable of performing a first set of finishing specifications, as well as an off-line finishing device capable of performing a second set of finishing specifications, wherein the print server includes:
   a first memory for storing the first set of finishing specifications capable of being performed by the on-line printer and the second set of finishing specifications capable of being performed by the off-line finishing device, as well as information regarding options installed thereon;
   a receiver for receiving from the client a job including data pertaining to a job ticket that includes at least finishing specifics for printing to be executed;
   a sorter for separating the finishing specifics included in the job ticket received by the receiver into finishing specifics selected from the stored first set of finishing specifics capable of being performed by the online printer, and finishing specifics selected from the stored second set of finishing specifics capable of being performed by the off-line finishing device, wherein those of the selected finishing specifics capable of being performed by the on-line printer are assigned to the on-line printer, and those of the selected finishing specifics capable of being performed by the off-line finishing device are assigned to the off-line finishing device;
   a setting unit for setting, in the on-line printer, parameters for the finishing specifics to be performed by the on-line printer as separated by the sorter and assigned to the on-line printer; and
   a creating unit for creating data for a finishing device job ticket that includes the finishing specifics to be performed by the off-line finishing device as separated by the sorter and assigned to the off-line finishing device.

2. A printing system as claimed in claim 1, wherein the print server further includes a transmitter for transmitting to the on-line printer the data pertaining to the finishing device job ticket created by the creating unit so as to print the finishing device job ticket.

3. A printing system as claimed in claim 2, further comprising an on-line scanner, and wherein the print server further includes:
   a second memory for storing job information and user information included in the job ticket received by the receiver;
   a reader for reading the job information from the data obtained by reading via the scanner the finishing device job ticket printed by the on-line printer; and
   a notifier for calling the user information stored in the second memory based on the job information read by the reader and notifying the client of job completion based on the user information.

4. A print server to be used in a printing system including an on-line client, a print server, a printer capable of performing a first set of finishing specifications, as well as an off-line finishing device capable of performing a second set of finishing specifications, the print server comprising:
   a first memory for storing the first set of finishing specifications capable of being performed by the on-line printer and the second set of finishing specifications capable of being performed by the off-line finishing device, as well as information regarding options installed thereon;
   a receiver for receiving from the client a job including data pertaining to a job ticket that includes at least finishing specifics for printing to be executed;
   a sorter for separating the finishing specifics included in the job ticket received by the receiver into finishing specifics selected from the stored first set of finishing specifics capable of being performed by the online printer, and finishing specifics selected from the stored second set of finishing specifics capable of being performed by the off-line finishing device, wherein those of the selected finishing specifics capable of being performed by the on-line printer are assigned to the on-line printer, and those of the selected finishing specifics capable of being performed by the off-line finishing device are assigned to the off-line finishing device;
   a setting unit for setting, in the on-line printer, parameters for the finishing specifics to be performed by the on-line printer as separated by the sorter and assigned to the on-line printer; and
   a creating unit for creating data for a finishing device job ticket that includes the finishing specifics to be performed by the off-line finishing device as separated by the sorter and assigned to the off-line finishing device.

5. A print server as claimed in claim 4, further comprising a transmitter for transmitting to the on-line printer the data pertaining to the finishing device job ticket created by the creating unit so as to print the finishing device job ticket.

6. A print server as claimed in claim 5, wherein the printing system further includes an on-line scanner, and the print server further comprises:
   a second memory for storing job information and user information included in the job ticket received by the receiver;
   a reader for reading the job information from the data obtained by reading via the scanner the finishing device job ticket printed by the on-line printer; and
   a notifying unit for calling the user information stored in the second memory based on the job information read by the reader and notifying the client of job completion based on the user information.

7. A non-transitory computer-readable medium containing a computer program to be used in a printing system which includes an on-line client, a printer capable of performing a first set of finishing specifications, as well as an off-line finishing device capable of performing a second set of finishing specifications, and which executes a print job based on a job ticket including at least finishing specifics for printing to be executed, the computer program causing a computer to execute processing comprising the steps of:

receiving the job ticket from the client;

separating the finishing specifics included in the received job ticket into finishing specifics selected from a first set of finishing specifics capable of being performed by the on-line printer that are stored in a memory, and finishing specifics selected from a second set of finishing specifics capable of being performed by the off-line finishing device that are stored in the memory, wherein those of the selected finishing specifics capable of being performed by the on-line printer are assigned to the on-line printer, and those of the selected finishing specifics capable of being performed by the off-line finishing device are assigned to the off-line finishing device;

setting, in the on-line printer, parameters for the finishing specifics to be performed by the on-line printer as separated and assigned to the on-line printer; and creating data for a finishing device job ticket that includes the finishing specifics to be performed by the off-line finishing device as separated and assigned to the off-line finishing device.

8. A computer-readable medium containing a computer program as claimed in claim 7, the processing further comprising a step of transmitting to the on-line printer the created data pertaining to the finishing device job ticket so as to print the finishing device job ticket.

9. A computer-readable medium containing a computer program as claimed in claim 8, wherein the printing system further includes an on-line scanner, and the processing further comprising the steps of:

storing job information and user information included in the received job ticket into a second memory;

reading the job information from the data obtained by reading the finishing device job ticket printed by the on-line printer; and calling the user information stored in the second memory based on the read job information and notifying the client of job completion based on the user information.

10. A printing system comprising an on-line client, a print server, a printer capable of performing a first set of finishing specifications, and an off-line finishing device capable of performing a second set of finishing specifications, wherein the print server includes:

a memory for storing the first set of finishing specifications capable of being performed by the on-line printer and the second set of finishing specifications capable of being performed by the off-line finishing device; and a processor that separates finishing specifics included in a received job ticket for a print job into finishing specifics selected from the stored first set of finishing specifics capable of being performed by the online printer, and finishing specifics selected from the stored second set of finishing specifics capable of being performed by the off-line finishing device, provides the on-line printer with parameters for the separated finishing specifics to be performed by the on-line printer, and generates a job ticket that includes the separated finishing specifics to be performed by the off-line finishing device.

11. A printing system as claimed in claim 10, wherein the print server further transmits to the on-line printer the data pertaining to the job ticket generated by the processor to print the finishing device job ticket.

12. A printing system as claimed in claim 11, further comprising an on-line scanner, and wherein the print server further includes:

a memory for storing job information and user information included in the received job ticket;

and wherein said processor reads job information input by the scanner from the job ticket printed by the on-line printer, retrieves the user information stored in said memory based on the job information input by the scanner, and notifies the client of job completion based on the user information.

13. A print server to be used in a printing system including an on-line client, a print server, a printer capable of performing a first set of finishing specifications, and an off-line finishing device capable of performing a second set of finishing specifications, the print server comprising:

a memory for storing the first set of finishing specifications capable of being performed by the on-line printer and the second set of finishing specifications capable of being performed by the off-line finishing device; and a processor that separates finishing specifics included in a received job ticket for a print job into finishing specifics selected from the stored first set of finishing specifics capable of being performed by the online printer, and finishing specifics selected from the stored second set of finishing specifics capable of being performed by the off-line finishing device, provides the on-line printer with parameters for the separated finishing specifics to be performed by the on-line printer, and generates a job ticket that includes the separated finishing specifics to be performed by the off-line finishing device.

14. A print server as claimed in claim 13, wherein the print server further transmits to the on-line printer the data pertaining to the job ticket generated by the processor to print the finishing device job ticket.

15. A print server as claimed in claim 14, wherein the printing system further includes an on-line scanner, and the print server further comprises:

a memory for storing job information and user information included in the received job ticket;

and wherein said processor reads job information input by the scanner from the job ticket printed by the on-line printer, retrieves the user information stored in said memory based on the job information input by the scanner, and notifies the client of job completion based on the user information.

16. A print server to be used in a printing system including a client, the print server, a printer capable of performing a first set of finishing specifications, and a finishing device that is separately provided from the printer and capable of performing a second set of finishing specifications, the print server comprising:

a first memory section that stores information on the first set of finishing specifications capable of being performed by the printer and the second set of finishing specifications capable of being performed by the finishing device;

a receiving section that receives from the client data pertaining to a job ticket that includes at least finishing specifics for printing to be executed; and a control section that separates, based on the first and second sets of finishing specifications respectively capable of being performed by the printer and the finishing device that are stored in the first memory section, the finishing specifics included in the job ticket received by the receiving section into a first group of finishing specifics selected from the stored first set of finishing specifics capable of being performed by the printer and a second group of finishing specifics selected from the stored second set of finishing specifics capable of being performed by the finishing device separately provided from the printer.

17. The print server as claimed in claim 16, further comprising:
a transmitting section that transmits information on the first group of specifics to the printer.

18. The print server as claimed in claim 17, wherein information on second group of the specifics is also sent to the printer.

19. The print server as claimed in claim 18, wherein the information on the second group of specifics is sent to the printer in a form of data to be printed by the printer.

20. The print server as claimed in claim 19, wherein the form of data complies with a page description language.

21. The print server as claimed in claim 19, wherein the finishing device is an off-line finishing device that is disconnected from the client, the print server, and the printer.

22. A printing system comprising:
an on-line client;
a print server;
an on-line printer having at least one first finishing feature; and
a finishing device having at least one second finishing feature;
wherein the print server includes:
a first memory for storing specifications capable of being performed by the on-line printer and specifications capable of being performed by the finishing device, as well as information regarding the first and second finishing features;
a receiver for receiving from the client data pertaining to a job ticket that includes at least finishing specifics to be executed;
a sorter for separating the finishing specifics included in the job ticket received by the receiver into finishing specifics selected from the stored specifications capable of being performed by the online printer, and finishing specifics selected from the stored specifications capable of being performed by the finishing device, wherein those of the selected finishing specifics capable of being performed by the on-line printer are assigned to the on-line printer, and those of the selected finishing specifics capable of being performed by the off-line finishing device are assigned to the off-line finishing device;
a setting unit for setting, in the on-line printer, parameters for the finishing specifics to be performed by the on-line printer as separated by the sorter and assigned to the on-line printer; and
a creating unit for creating data for a finishing device job ticket that includes the finishing specifics to be performed by the finishing device as separated by the sorter and assigned to the finishing device.

23. A printing system as claimed in claim 22, wherein the print server further includes a transmitter for transmitting to the on-line printer the data pertaining to the finishing device job ticket created by the creating unit so as to print the finishing device job ticket.

24. A print server to be used in a printing system including an on-line client; a print server; an on-line printer having at least one first finishing feature; and a finishing device having at least one second finishing feature;
the print server comprising:
a first memory for storing specifications capable of being performed by the on-line printer and specifications capable of being performed by the finishing device, as well as information regarding the first and second finishing features;
a receiver for receiving from the client data pertaining to a job ticket that includes at least finishing specifics to be executed;
a sorter for separating the finishing specifics included in the job ticket received by the receiver into finishing specifics selected from the stored specifications capable of being performed by the online printer, and finishing specifics selected from the stored specifications capable of being performed by the finishing device, wherein those of the selected finishing specifics capable of being performed by the on-line printer are assigned to the on-line printer, and those of the selected finishing specifics capable of being performed by the off-line finishing device are assigned to the off-line finishing device;
a setting unit for setting, in the on-line printer, parameters for the finishing specifics to be performed by the on-line printer as separated by the sorter and assigned to the on-line printer; and
a creating unit for creating data for a finishing device job ticket that includes the finishing specifics to be performed by the finishing device as separated by the sorter and assigned to the finishing device.

25. A non-transitory computer-readable medium containing a computer program to be used in a printing system which includes an on-line client; a print server; an on-line printer having at least one first finishing feature; and a finishing device having at least one second finishing feature, the computer program causing a computer to execute processing comprising the steps of:
receiving the job ticket from the client;
separating finishing specifics included in the received job ticket into finishing specifics selected from a first set of finishing specifics capable of being performed by the on-line printer that are stored in a memory, and finishing specifics selected from a second set of finishing specifics capable of being performed by the finishing device that are stored in the memory, wherein those of the selected finishing specifics capable of being performed by the on-line printer are assigned to the on-line printer, and those of the finishing specifics capable of being performed by the off-line finishing device are assigned to the off-line finishing device;
setting, in the on-line printer, parameters for the finishing specifics to be performed by the on-line printer as separated and assigned to the on-line printer; and
creating data for a finishing device job ticket that includes the finishing specifics to be performed by the finishing device as separated and assigned to the finishing device.

26. A printing system comprising:
an on-line client;
a print server;
an on-line printer having at least one first finishing feature; and
a finishing device having at least one second finishing feature;

wherein the print server includes:

a receiver for receiving from the client data pertaining to a job ticket that includes finishing specifics to be executed;

a sorter for separating the finishing specifics included in the job ticket received by the receiver into finishing specifics selected from a stored first set of finishing specifics capable of being performed by the online printer, and finishing specifics selected from a stored second set of finishing specifics capable of being performed by the finishing device, wherein those of the selected finishing specifics to be performed by the on-line printer are assigned to the on-line printer, and those of the selected finishing specifics to be performed by the off-line finishing device are assigned to the off-line finishing device;

a setting unit for setting, in the on-line printer, parameters for the finishing specifics to be performed by the on-line printer as separated by the sorter and assigned to the on-line printer; and a creating unit for creating data for a finishing device job ticket that includes the finishing specifics to be performed by the finishing device as separated by the sorter and assigned to the finishing device.

27. A printing system as claimed in claim 1, wherein the on-line printer is capable of performing finishing procedures and the off-line finishing device is not connected to the on-line printer or the on-line print server.

* * * * *